United States Patent

[15] 3,694,646

Hicks

[45] Sept. 26, 1972

[54] LIGHTING SYSTEMS FOR ROAD VEHICLES

[72] Inventor: Harris Vernon Hicks, Lichfield, England

[73] Assignee: Joseph Lucas (Industries) Limited, Birmingham, England

[22] Filed: Dec. 14, 1970

[21] Appl. No.: 97,964

[30] Foreign Application Priority Data

Dec. 17, 1969 Great Britain..........61,437/69

[52] U.S. Cl. ............240/41.3, 240/46.05, 240/46.29
[51] Int. Cl...............................................F21v 13/04
[58] Field of Search...240/7.1 R, 7.1 A, 8.1 R, 46.05, 240/46.17, 46.21, 46.25, 46.29, 46.53, DIG. 6, 41.3

[56] References Cited

UNITED STATES PATENTS 3,486,066  12/1969  Jones et al. ..........240/46.05 X
1,667,949  1/1928   Ring......................240/46.53

FOREIGN PATENTS OR APPLICATIONS 912,667  12/1962  Great Britain........240/DIG. 6

Primary Examiner—Samuel S. Matthews
Assistant Examiner—Fred L. Braun
Attorney—Holman & Stern

[57] ABSTRACT

A lighting system for a road vehicle includes a projector for producing a beam of light illuminating the road in front of a vehicle equipped with the lighting system. The projector includes a light source, a focussing device for producing an image in an aperture in a mask positioned in front of the light source, and a lens positioned on the side of the mask remote from the light source the lens directing the light issuing through the aperture in the mask to constitute the beam. A shutter is movable across the aperture in the mask in response to light received from in front of the vehicle. As the shutter moves across the aperture, the projected beam is progressively cut off from one side thereof. The lens of the projector is so disposed with respect to the remainder of the system that a generally horizontally extending diameter of the lens lies at an angle of between 88° and 84° to the optical axis of the projector, the lens being tilted about a vertical axis towards the near side of the vehicle.

3 Claims, 2 Drawing Figures

PATENTED SEP 26 1972 3,694,646
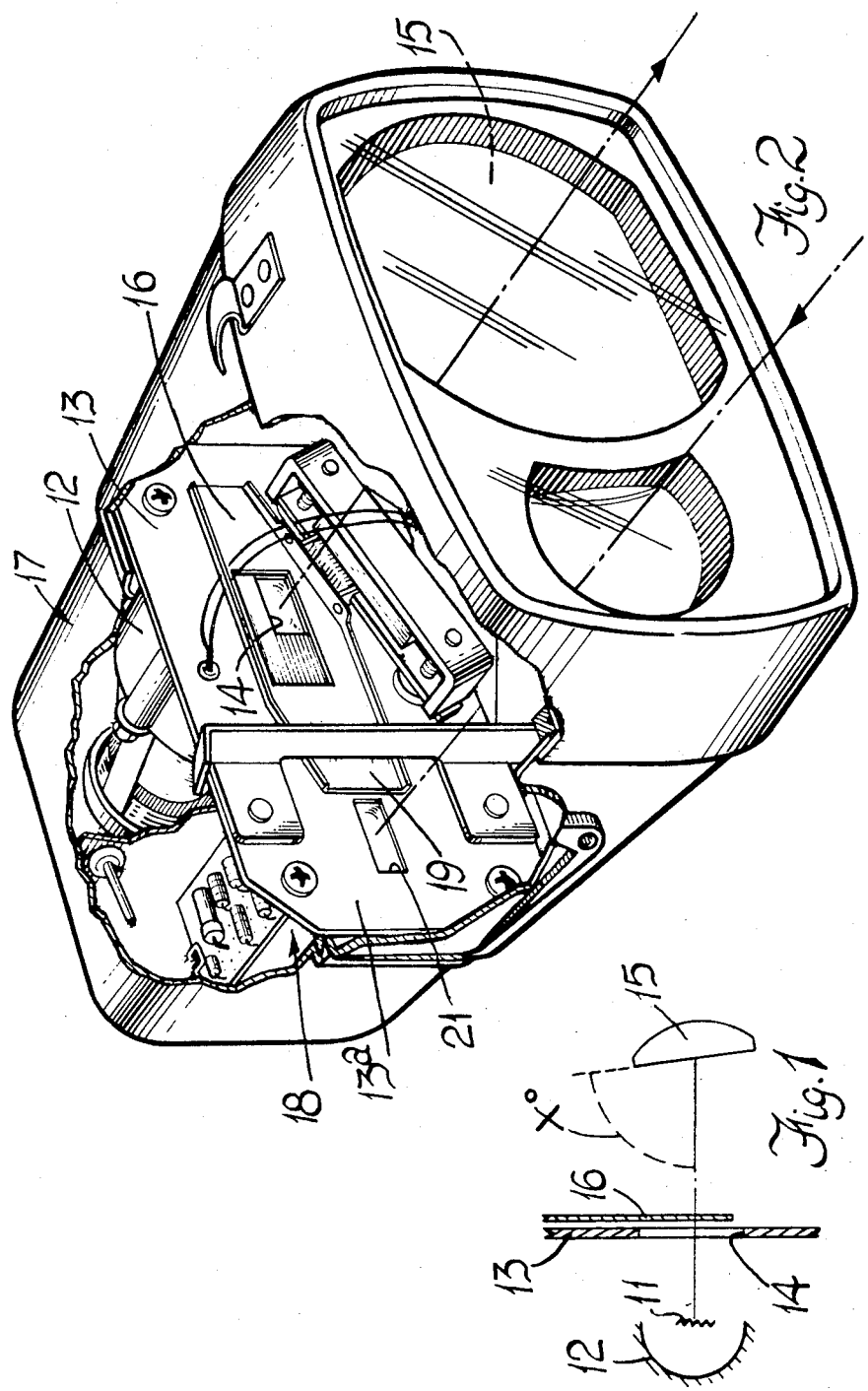
INVENTOR
Harris Vernon Hicks
Holman & Stern
ATTORNEYS

LIGHTING SYSTEMS FOR ROAD VEHICLES

This invention relates to lighting systems for road vehicles.

A system according to the invention includes a projector including a light source and an associated lens for producing a beam of light illuminating the road in front of the vehicle, a mask between the light source and the lens said mask having therein an aperture, focussing means associated with light source and arranged so that a well defined image of said aperture is projected forwardly to constitute said beam, a shutter movable from a rest position across said aperture, and means sensitive to light received from an oncoming vehicle for progressively moving said shutter to cut off sufficient of said projected beam to avoid dazzling the driver of the oncoming vehicle, characterized in that said lens is so disposed that a generally horizontally extending diameter of the lens lies at an angle of between 88° and 84° to the optical axis of the projector, the lens being tilted, about a vertical axis, so as to be tilted towards the near side of a vehicle equipped with the system.

In the accompanying drawings,

FIG. 1 is a sectional, diagrammatic representation of part of a lighting system according to one example of the envention and FIG. 2 is a perspective view of a practical embodiment of the system.

Referring to the drawings the lighting system includes a light projector including a light source 11 in the form of a high intensity bulb having an elongated filament the center of which is situated at one focus of a part elipsoidal mirror 12. Parallel to the filament of the bulb 11 is a mask 13 having therein a rectangular aperture 14 the center of which lies at the other focus of the mirror 12, so that an image of the filament appears in the aperture 14. Light passing through the aperture 14 passes through a plano-convex lens 15 which provides a beam of light projected forwardly of the vehicle. The optical distance between the aperture 14 and the lens 15 is substantially equal to the focal length of the lens 15, so that a well defined image of the aperture is projected forwardly as a beam of rectangular cross section.

Movable across the aperture 14 is a shutter 16 which prevents part of the light from the filament of the bulb 11 from reaching the lens 15. The arrangement is such that progressive movement of the shutter cuts off an increasing portion of the projected beam starting from the side of the beam nearer the center of the road in use. Associated with the projector is a receiver 18 which in use receives light from an oncoming vehicle, the projector and receiver being housed in a common casing 17. The receiver includes a photo cell, and the optical arrangement of the receiver is such that the receiver sees the maximum field which can be illuminated by the projected beam when the shutter 16 is in its retracted position. The receiver includes a shutter 19 which is movable with the shutter 16 across an aperture 21 in a mask 13a co-planar with and integral with the mask 13, and the output from the photo cell when light falls on the photo cell is employed to move the shutters 16,19. Thus when the lights of an oncoming vehicle in the field of the projected beam are seen by the receiver the photo cell produces an output, and the shutter 16 is moved to cut off sufficient of the projected beam to exclude the driver of the oncoming vehicle from the projected beam, so that the driver of the oncoming vehicle is not dazzled. The shutter 19 moves with the shutter 16 and the arrangement is such that the shutters 16,19 follow the lights of the oncoming vehicle as the relative positions of the vehicles change, so that the driver of the oncoming vehicle is always in the shadow of the shutter 16.

The projector includes filtering means, for example, a dichoic coating on the mirror 12 for removing the majority of the red and infra red wavelengths from the projected beam. The photo cell in the receiver is rendered sensitive principally to the red and infra red wavelengths of light, and so the risk of operation of the system by its own reflected light is minimized. However, it is found that in certain operating conditions, the driver of a vehicle travelling in front of the vehicle equipped with the system can see a flash of red light in his rear view mirror, one of the operating conditions when the red flash can occur being when the system reacts to the rear lights of a vehicle in front of the vehicle equipped with the system, to cut off, completely or partially, the projected beam. Clearly, such an occurrence can be disconcerting for the driver of the vehicle travelling in front of the vehicle equipped with the system, and it has been found that the occurrence of such red flash can be virtually eliminated by positioning the lens 15 so that a substantially horizontal diameter of the lens 15 extends at an angle of between 84° and 88° preferably 87°to the optical axis of the projector, the lens 15 being tilted relative to the remainder of the receiver about a vertical axis, towards the near side of the vehicle equipped with the system. Furthermore, it has been found that such positioning of the lens 15 does not substantially affect the normal operation of the system, and that the red flash is virtually eliminated even if the filtering means for removing the majority of the red and infra red wavelengths from the projected beam is not provided. However, the filtering means is of course desirable to minimize the risk of operation of the system by its own reflected light.

Having thus described my invention what I claim as new and desire to secure by Letter Patent is:

1. A lighting system for a road vehicle including a projector, the projector comprising a light source, a mask adjacent the light source and having therein an aperture, focussing means associated with the light source for focussing light from said source into said aperture, a lens associated with the light source, and positioned on the side of said mask remote from the light source, the mask and the lens being so positioned relative to one another that the aperture in the mask lies at the focal point of the lens, whereby a well defined image of said aperture is projected forwardly to constitute a beam of light illuminating the road in front of the vehicle equipped with the system, a shutter movable from a rest position across said aperture so as to progressively cut off a portion of said projected beam, from one side of the beam, and the lighting system including means sensitive to light received from an oncoming vehicle for progressively moving said shutter to cut off a sufficient portion of said projected beam, from said one side of the beam, to avoid dazzling the driver of the oncoming vehicle, the lens of the projector being so disposed that a generally horizontally extending diameter of the lens lies at an angle of between 88° and 84° to the optical axis of the projector, the lens being tilted about a vertical axis so as to be tilted away from said one side of the beam produced by the projector.

2. A system as claimed in claim 1 where said horizontally extending diameter of the lens lies at an angle of 87° to the optical axis of the projector.

3. A system as claimed in claim 1 wherein means is provided for removing the majority of the red and infra red wavelengths from the projected beam.

* * * * *